United States Patent [19]
Liebesny et al.

[11] Patent Number: 5,131,020
[45] Date of Patent: Jul. 14, 1992

[54] METHOD OF AND SYSTEM FOR PROVIDING CONTINUALLY UPDATED TRAFFIC OR OTHER INFORMATION TO TELEPHONICALLY AND OTHER COMMUNICATIONS-LINKED CUSTOMERS

[75] Inventors: John P. Liebesny, Concord; Sheldon Apsell, Newton; John Mahon, Attleboro; Paul J. Bouchard, Concord, all of Mass.

[73] Assignee: SmartRoutes Systems Limited Partnership, Cambridge, Mass.

[21] Appl. No.: 458,986

[22] Filed: Dec. 29, 1989

[51] Int. Cl.⁵ .................. H04M 11/08; G08G 1/09
[52] U.S. Cl. .................. 379/59; 379/209; 379/100; 340/905
[58] Field of Search ........... 379/57, 61, 59, 60, 379/63, 209, 89, 100; 455/33, 53, 54; 340/905, 910

[56] References Cited

U.S. PATENT DOCUMENTS

| | | | |
|---|---|---|---|
| 4,023,017 | 3/1977 | Ceseri | 340/905 |
| 4,166,929 | 9/1979 | Sheinbein | 379/209 |
| 4,311,876 | 1/1982 | Endo et al. | 455/54 |
| 4,736,405 | 4/1988 | Akiyama | 379/89 |
| 4,812,843 | 3/1989 | Champion, III et al. | 379/57 |

FOREIGN PATENT DOCUMENTS

| | | | |
|---|---|---|---|
| 0085013 | 8/1983 | European Pat. Off. | 340/905 |
| 3536820 | 4/1987 | Fed. Rep. of Germany | 340/905 |
| 0121383 | 9/1979 | Japan | 340/905 |
| 0151301 | 11/1979 | Japan | 455/54 |
| 0234632 | 10/1986 | Japan | 455/54 |
| 0290679 | 11/1988 | Netherlands | 340/905 |
| 2216319 | 10/1989 | United Kingdom | 379/61 |

OTHER PUBLICATIONS

Publication: "Hello Direct" Catalog, Portable Fax Machine, Single-Line FAX Phone, May 1988.

Primary Examiner—James L. Dwyer
Assistant Examiner—Dwayne D. Bost
Attorney, Agent, or Firm—Rines and Rines

[57] ABSTRACT

A novel method, system and protocol for providing continually updated traffic (and other) information from a central station to preferably telephonically linked caller customers (though other communication links are feasible), involving enabling the caller to enter on the caller's keyboard a code for the particular zone for which a traffic information report is desired, and thereupon to receive a transmission of such report from the central station; and then, by further caller keyboard entires, requesting reports on additional specified zones —all on the same call—and further requesting from the station, by keyboard entry, automatic updating report(s) in the specified zone(s) in the event of significant changes in traffic information (including traffic incidents) during a predetermined time after the initial report.

23 Claims, 10 Drawing Sheets

ROAD CONSTRUCTION
DELAYS

JUST REPORTED...

◬ RT. 3A AT RT. 228-HIGDON- RESURFACING OF NORTHBOUND LANES BEGINNING TODAY. EXPECT DELAYS OF 10-15 ADDITIONAL MINUTES DURING MORNING COMMUTE.

◬ HARVARD BRIDGE - CAMBRIDGE - PAINT CREWS WILL DISRUPT TRAFFIC IN BOTH DIRECTIONS BETWEEN THE HOURS OF 9 AM AND 3 PM TODAY AND TOMORROW.

◬ RT. 495 AT 123 - INSTALLATION OF OVERHEAD SIGNS WILL REDUCE TRAFFIC TO ONE LANE IN EACH DIRECTION. EXPECT DELAYS OF NO MORE THAN 5-7 MINUTES.

◬ MASS PIKE WEST OF 495 - SHOULDER WORK BEGINS TODAY ON EASTBOUND SIDE. TRAFFIC WILL BE OCCASIONALLY BLOCKED BETWEEN 8 AM AND 4 PM FOR THE NEXT 3 DAYS. MAXIMUM DELAYS OF 8-10 MINUTES SHOULD BE EXPECTED.

◬ RT. 3A IN BILLERICA - SURVEY CREWS WORKING IN BOTH DIRECTIONS NEAR APPROACH TO RT. 129.

ONGOING...

🅰 CENTRAL ARTERY - BOSTON - HIGH ST. EXIT CLOSED FOR 6 MONTHS. SOUTHBOUND TRAFFIC SHOULD EXIT AT CHINA TOWN.

🅱 RT. 133 IN BOXFORD - RESURFACING OF SOUTHBOUND LANES WILL CAUSE ESPECIALLY HEAVY BACKUPS DURING MORNING COMMUTE. SUGGEST 93 OR 95 AS ALTERNATE.

🅲 RT. 495 AT RT. 111 - BOXBOROUGH - REPAIR OF DAMAGED NORTHBOUND OVERPASS. BOTH LANES OPEN BUT DELAYS OF 5 MINUTES SHOULD BE EXPECTED DUE TO DETOUR SLOWDOWN.

🅳 RT. 44 IN MIDDLEBOROUGH - ROAD WIDENING AND RESURFACING IN BOTH DIRECTIONS DURING THE NEXT 2 MONTHS. EXPECT OCCASIONAL DELAYS BETWEEN 8 AM AND NOON.

🅴 RT. 20 IN SUDBURY - THREE MILES NORTH OF TOWN LINE BEING WIDENED AND RESURFACED. WILL CAUSE MODERATE DELAYS DURING MORNING AND AFTERNOON COMMUTES.

🅵 RT. 495 IN BOURNE - BRIDGE DECK REPLACEMENT CONTINUES THROUGH DECEMBER. TRAFFIC REDUCED TO ONE LANE AND MODERATE AM AND PM DELAYS WILL PERSIST WEEKDAYS. MAXIMUM DELAYS OF 15 MINUTES SHOULD BE EXPECTED.

METHOD OF AND SYSTEM FOR PROVIDING CONTINUALLY UPDATED TRAFFIC OR OTHER INFORMATION TO TELEPHONICALLY AND OTHER COMMUNICATIONS-LINKED CUSTOMERS

The present invention relates to information communication between a central station and a plurality of subscribers telephonically linked (by land lines or radio links) or otherwise specially communication-linked to the station; being more particularly directed to user-friendly information requesting procedures and continually updated responses to information requests, as in the field of traffic information and other types of information as to which the subscriber requires fast access to select blocks of such information (such as particular geographical zones of traffic information) and automatic updating of rapid changes within predetermined times following an information communication.

BACKGROUND

Considering, for example, the traffic information application of the invention, there is growing frustration and much wasted time experienced particularly by mobile individuals in metropolitan areas, caused by encountering ever-increasing traffic congestion, unexpected traffic problems and frequent unpredictable delays. While radio stations provide a measure of periodic traffic updates, this requires constant listening to the particular radio station awaiting the time slot of traffic condition commentary, trying to sift from the omnibus traffic information supplied over relatively wide geographical areas the immediately useful information on the particular sector where the listener is located and is headed, and often receiving outdated and incomplete information, at that. At best, moreover, such traffic information is offered every fifteen minutes or so during rush hours and every half hour sandwiched with the news during off-peak times, and only for about 20-second time slots at that. Few cities provide any weekend coverage. The radio reports are delivered in rapid-fire form, embracing wide areas and are hard to understand, let alone visualize. In addition, due to limited air time, the traffic reporters rarely get back to tell the listeners that a problem has cleared up, thus precipitating unnecessary detours when not actually needed.

Underlying the present invention, as applied to this problem, is a novel technique, system and protocol that insures the continual collection of updated traffic information from a plurality of independent sources at a central station, the prompt telephone access to that station by the subscriber at any desired time, the specific limitation of the information supplied to the subscriber-selected geographical zone(s) of interest only, and the automatic update of the subscriber from the station if there are significant changes in the information within a predetermined time period following the last information transmission. The invention thus provides accurate, timely and complete information in a format that is easily discernable by the subscriber and does so in a way that minimally intrudes on the subscriber during his or her travels, with the goal of promptly giving the driver the information that is necessary to take an alternative route or make alternative plans. The user can literally plan the route to work, for example, while having morning coffee; or, while enroute, if the traffic conditions change, being notified immediately instead of having to wait for the next traffic report on the radio and/or possibly missing the opportunity to exit the route and avoid a problem. In addition, in accordance with the flexibility afforded by the invention, the driver has the freedom to listen to the radio station of his or her choice, or not to listen; or to listen to tapes instead of the radio; or to converse with a passenger or on the car phone -- all the while being assured that the subscriber will be afforded immediate knowledge of a traffic problem ahead.

OBJECTS OF INVENTION

The object of the invention, therefore, as applied to the communication of traffic information, is to provide a new and improved method, system, service and protocol for providing continually updated traffic information to telephonically (and other special communications) linked customers, that admirably solve the present-day problems and limitations in radio station traffic information, and provide a new degree of choice by the subscriber in limiting the information to selected desired areas only of the subscriber's choice, in facility to change the requested areas of information, and in obtaining automatic updating of significant changes from the last received traffic report.

A further object is to provide a novel method and system of this character that are more generally useful, also, with other types of information wherein the features of the invention are also desirable.

Other and further objects will be explained hereinafter and are more particularly delineated in the appended claims.

SUMMARY

In summary, however, from the viewpoint of its application to the pressing traffic problems currently besetting the nation, the invention embraces a method of traffic information telephone channel communication between a central station and a plurality of callers distributed in different zones throughout a geographical area and all telephonically linked with said station, that comprises, collecting and updating traffic information useful for said callers from a plurality of sources and on a real-time and continual basis for all the zones throughout said area; responding to the telephone dialing of the station on the caller's telephone keyboard and the entering on said keyboard of a code for the particular zone of interest so specified by the caller, by telephonically transmitting back from the station to such caller a report of the traffic information requested by the caller and in the particular zone specified by the caller; responding to the caller's further keyboard entry requesting automatic updating of significant changes in the traffic information within said specific particular zone within a limited predetermined time period following said report, by storing the caller's telephone number and causing the station to call back said caller's telephone number to deliver such udpate of significant changes should they occur in that zone within that limited time period following said report. Applications of the principles of the invention to other types of information communication, and best mode and preferred detail embodiments are later presented.

DRAWINGS

The invention will now be described with reference to the accompanying drawings, FIG. 1 of which is a block diagram of a complete data gathering, processing and central station dissemination transmission or communication system for relaying traffic information to the remote subscribers.

DESCRIPTION

In accordance with the invention, a complete data gathering, processing and dissemination system for traffic information is provided wherein (1) information is kept extremely current and updates are broadcast within minutes of their receipt; (2) information is available whenever the customer wants it (on demand, 24 hours a day) via several distribution methods; (3) information is location-specific—i.e., a customer can selectively listen to (or view) data for a specific part of a metropolitan area; and (4) the user interface is passive; i.e., once an area of interest is selected, the system will keep the user informed of changes in traffic conditions without any further action on the user's part.

Figure 1:
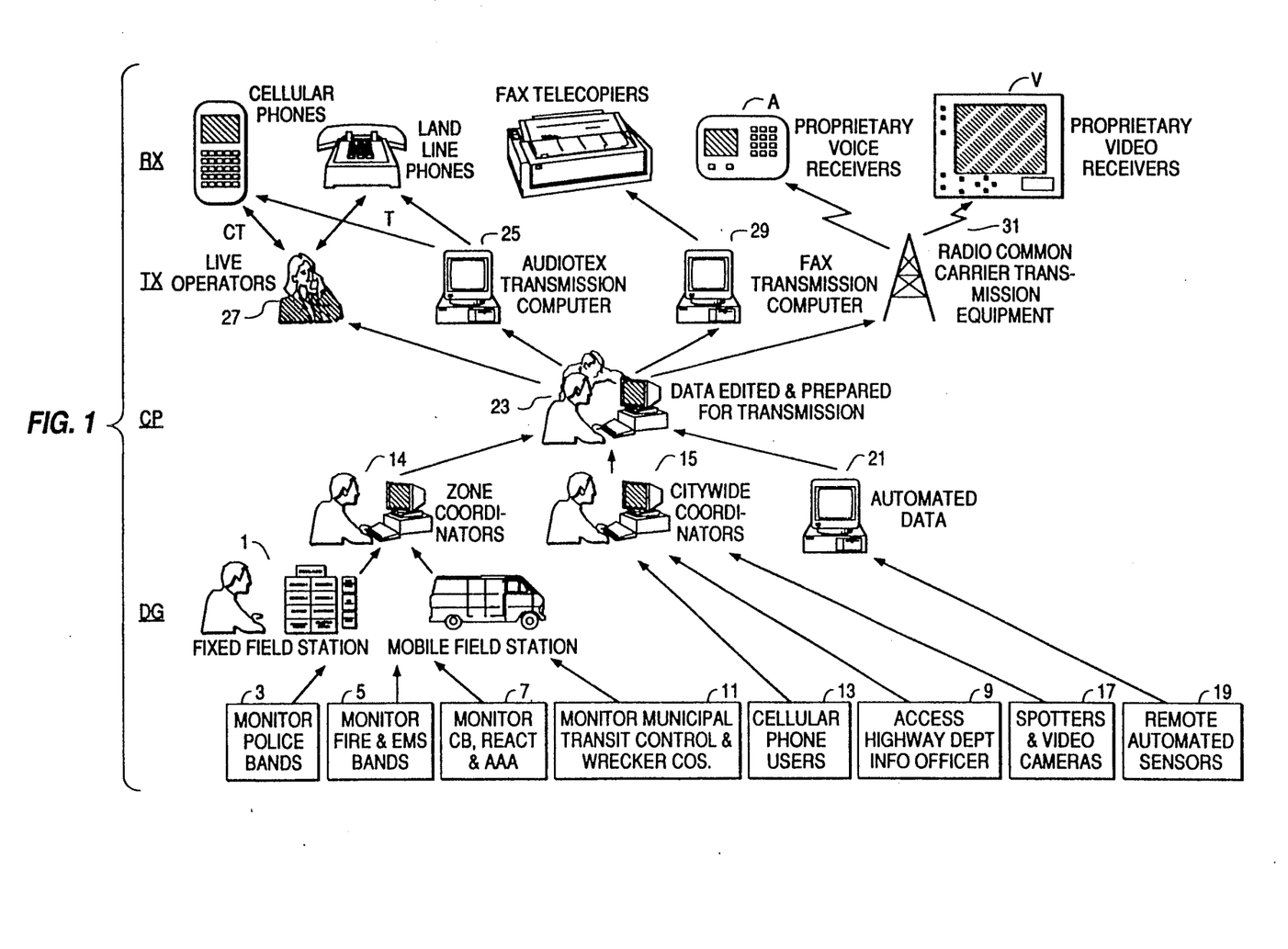

The system architecture of FIG. 1 consists of four elements: Data Gathering DG, Central Processing CP, Transmission Networks TX and Customer Receivers RX. The real-time Data Gathering component DG consists of:

1. Field fixed and mobile monitoring stations 1, which will each monitor information from the police 3, fire department 5, emergency-wrecker sources 11, automobile service (AAA) and Citizens Band sources 7 in specific parts of the city, coordinated mainly at 14;

2. Central Station monitoring at 23 of city-wide dispatch services such as highway department 9 and cellular telephone users 13, coordinated at 15;

3. Television cameras and visual spotters 17 at key check points; and

4. Automated electronic sensors 19 which will measure traffic volume and flow rate. These sensors may use infra-red technology to sense traffic movement, can be solar powered and radio-linked back to the Central Station as at 21. Such may also be city-installed sensors or linked to city computers.

At the Central Processing CP, the Central Station 23 receives the manually and automatically collected data, verifies its accuracy, and prepares the information for broadcast. The Central Station uses both humans and computers to receive, verify, edit and otherwise prepare the information, and all broadcast information will also be stored in database format and archived for future traffic flow studies.

Figure 2:
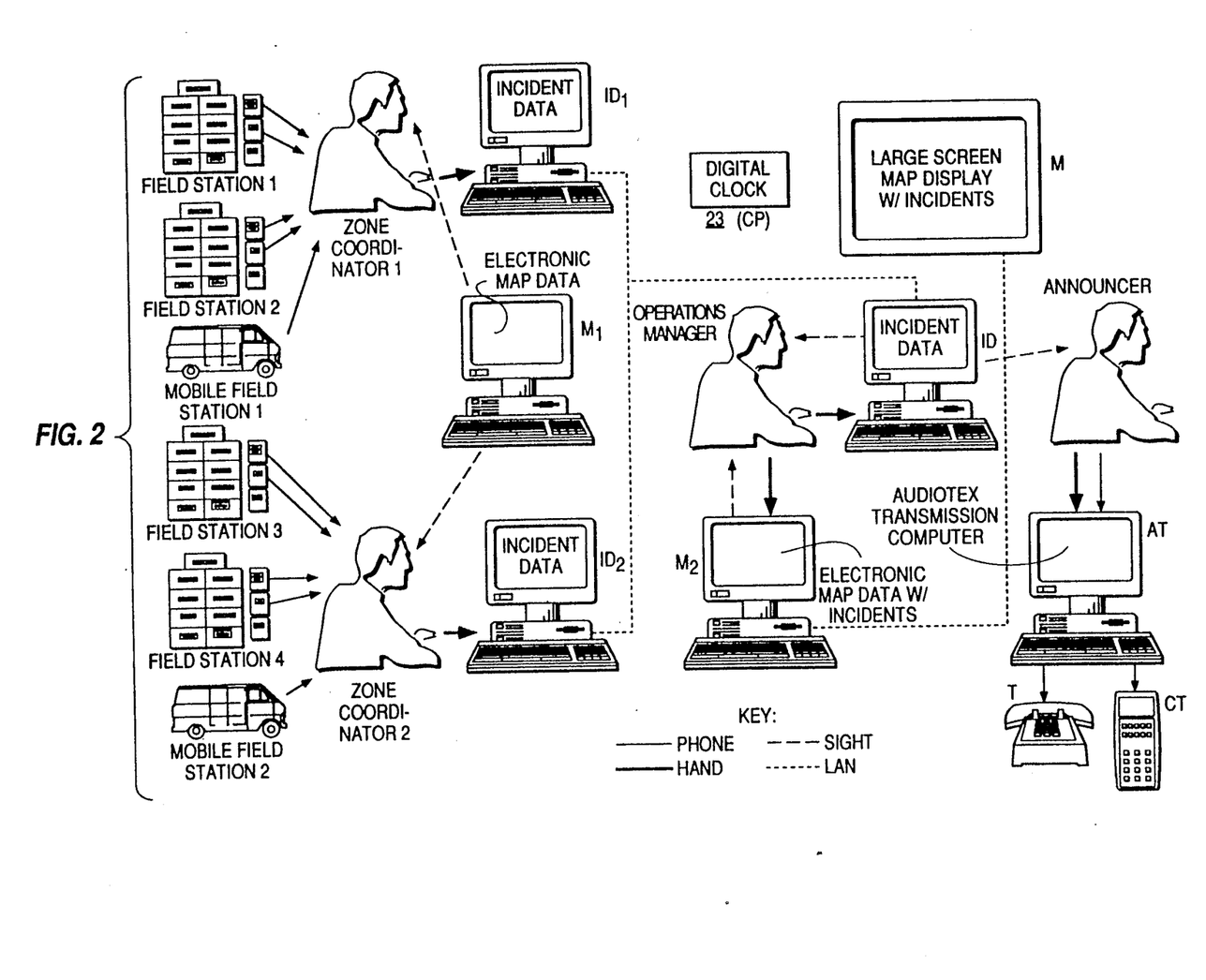
FIG. 2 is a more detailed diagram of the continual data-collecting and processing techniques.

A Central Station diagram is shown in FIG. 2 with two different geographical information zones served, respectively, by fixed Field Stations 1 and 2 and Mobile Field Station 1 for Zone 1 and fixed Field Stations 3 and 4 and Mobile Field Station 2 for Zone 2. The stations are shown at the far left, each equipped with digitally clocked scanners, CB and 2-way radio and tape recorders and other well-known related apparatus so-labelled.

As shown in the legend or key of FIG. 2, the light line arrow connections represent telephone inputs; the heavy line, hand-delivered inputs; the dash-line arrow, sight communication by the operators and the dotted line, incident data interconnections (LAN) with large screen map display (with incident information), also so-labelled.

Figure 3A:
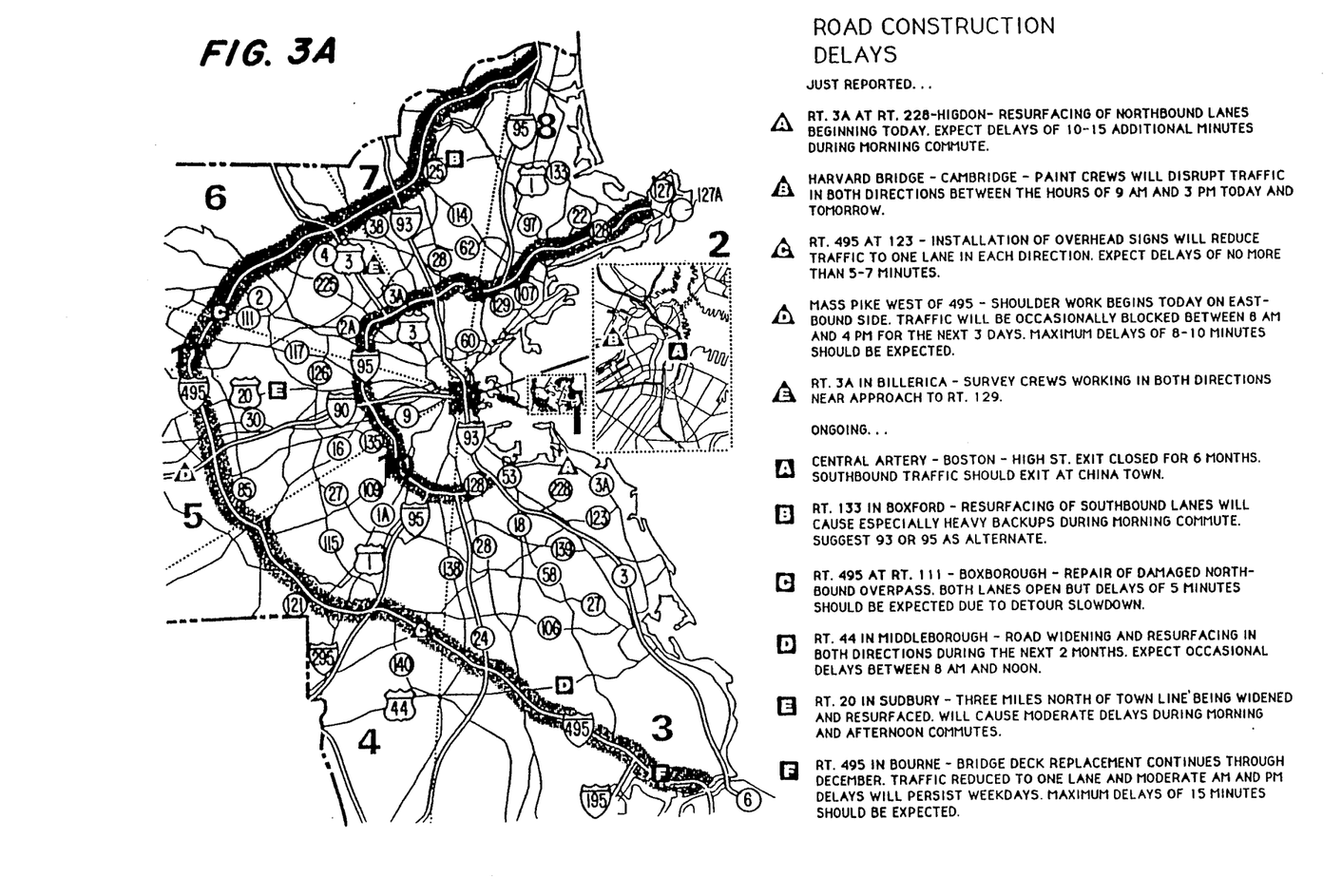
FIGS. 3A and 3B are zone maps with reported incidents.
Figure 3B:
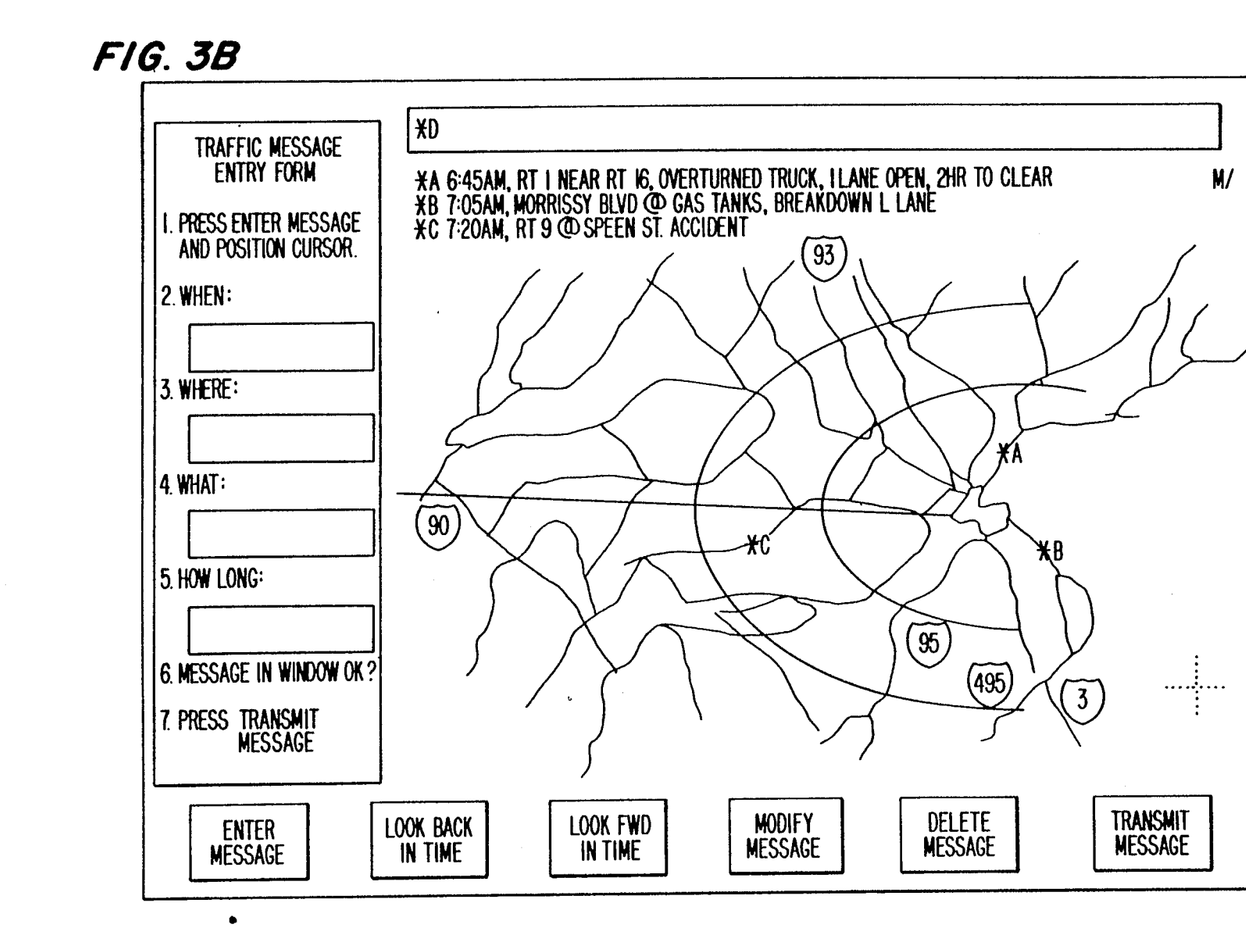

In FIG. 2, the field station data from Zone 1 is illustrated as communicated to Zone Coordinator 1 (and similarly for Zone 2 to Zone Coordinator 2) who enters incident data in that zone keyboard station $ID_1$ (and $ID_2$ for Zone 2) with reference to supplied electronic map data at $M_1$. The operations manager (at 23 in FIG. 1), shown in the center part of FIG. 2, monitors the main incident data station ID that receives traffic incident information from the multiple zone incident data stations ($ID_1$, $ID_2$, etc.), and enters the same at the electronic map data station $M_2$, preferably displaying therefrom on a large screen M the map display with the traffic incidents illustrated thereon as more fully shown and later described in connection with FIG. 3B.

The manner in which this Central Station with its Audiotext transmission computer AT (coined "Audiotex") interfaces with the overall system will later be described in detail in connection with the operational flow diagram of FIGS. 5A and 5B. The Central Station, however, may also provide ancillary service information such as headline news, 5-day weather forecasts, sports scores, airline departure/arrival information, airport parking conditions, restaurant reviews, etc. Further, Central Station operators can provide an online locator service via telephone T (including cellular phones CT) and/or or fax (top of FIG. 1).

Verified information may be prepared for transmission preferably in one of two ways, or both. First, data can be verbally entered by an announcer (FIG. 2) into a voice processing type of "Audiotex" computer AT, before mentioned, which will store editable location-specific messages on disc that can be accessed by a user who dials into the system and enters the user's selected geographical location zone number, as later explained. New information and updates will be stored along with a list of call-back phone numbers, so that customers who so desire can be alerted of a change in traffic conditions via an automated call-back to their cellular phone CT, as also more fully described in connection with FIGS. 5A and 5B. Secondly, the data can be entered onto the computer screens $M_2$ and $M_1$, FIG. 2, as more fully shown in FIG. 3B. In the exemplary display of FIG. 3B, traffic incidents A, B and C, identified at the top, are shown indicated on the map M of the geographical zone in question. The computer, thus, using specialized mapping software, determines the incident location (pixel address) and encodes the text information for transmission, including to proprietary special audio and video receivers(A and V in FIG. 1) if desired, as later described in connection with embodiment of FIG. 6. New information as well as updates will be prepared in this manner and broadcast at frequent intervals.

Referring now to the transmission network TX of the overall system of FIG. 1, at least four transmission techniques are most useful. First, existing land-line telephone systems serviced by the "Audiotex" computer AT at 25 in FIG. 1, which will carry the interactive audiotext messages to landline telephones T. The telephones T may also receive information from live operators 27. Similarly, the "Audiotex" computer AT (FIGS. 1 and 2) will carry the interactive audiotext and callback messages to cellular telephone receivers CT. The Central Station, through FAX transmission computer 29 can also carry graphic and text messages to facsimile (FAX) and related telecopiers.

While the invention has been described thus far in connection with telephone (land line and radio phones such as cellular phones), as earlier stated, other types of central station-subscribed communication links are also useful. Thus, in addition to FAX telecopiers, as for receiving hard copy locator maps (FIGS. 3A and 3B) overlaid with traffic conditions at that moment, the customer receiving equipments shown at RX in FIG. 1, may include supplementary to or in substitution for the land-line phones T and cellular phones CT, radio or other communication links to the before-mentioned proprietary audio receivers A for receiving the audiotext messages in the car without the need for a cellular phone, and/or the proprietary portable video receivers V for displaying traffic incident location and alert text information as well as ancillary service information (FIGS. 3B and 4), through a radio common carrier transmission equipment 31 fed from the Central Station CP. In the latter circumstance, each caller will have an identification code channel analagous to the caller's telephone number or subscriber number as later more fully explained in connection with the embodiment of FIG. 6.

Figure 5A:
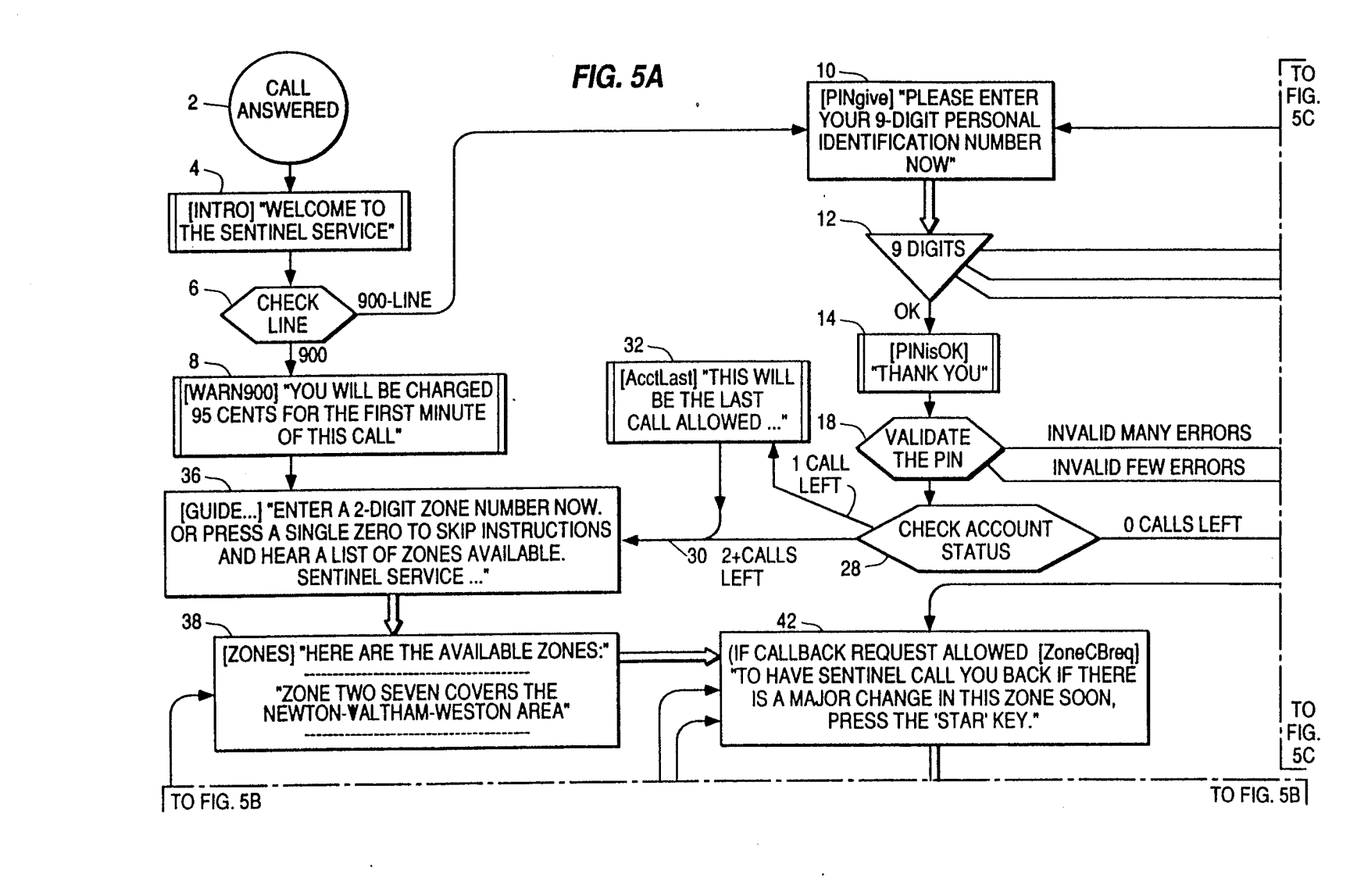
FIGS. 5A to 5D together comprise a flow chart describing the software-controlled protocol for effecting the performance of the invention.
Figure 5B:
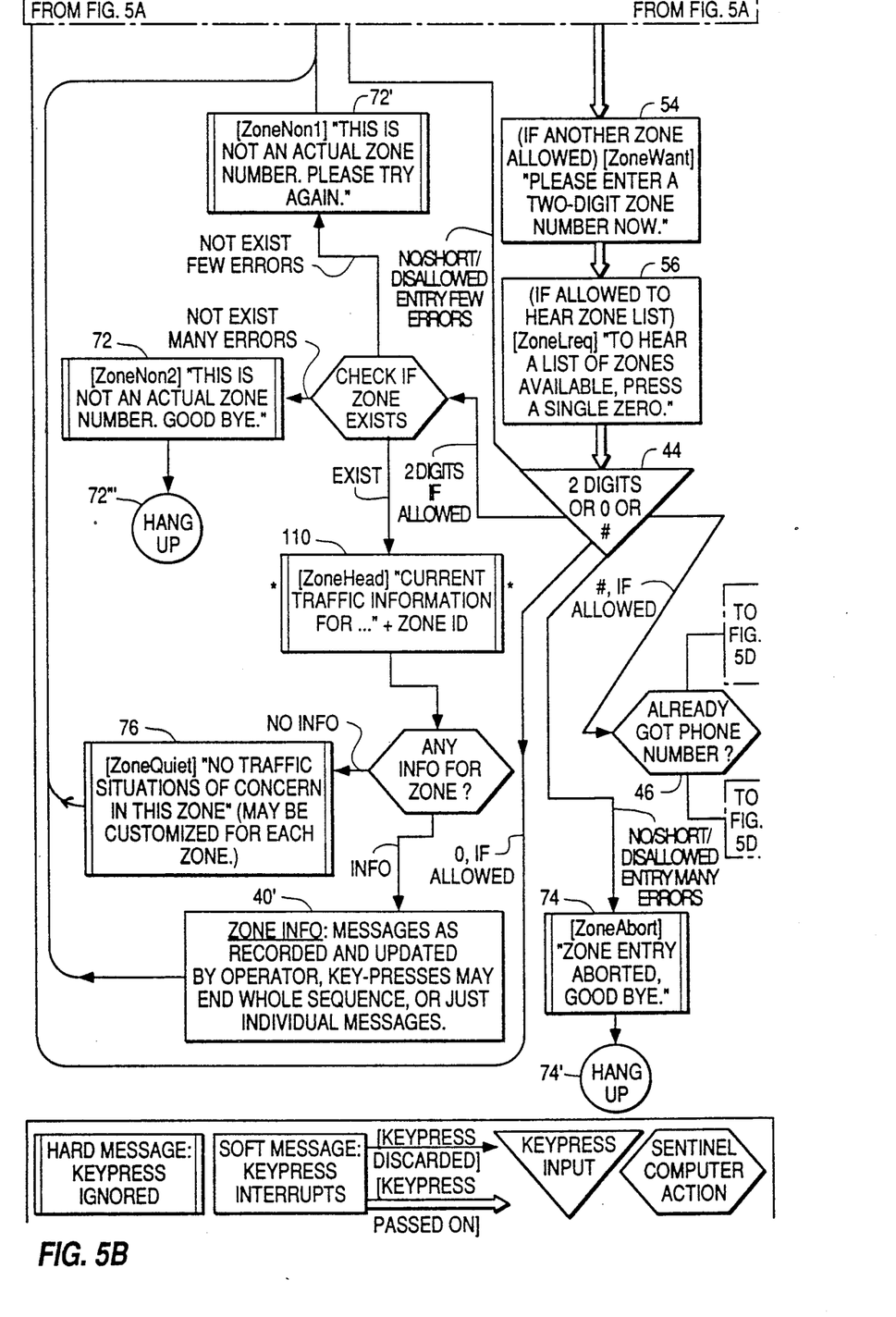
Figure 5C:
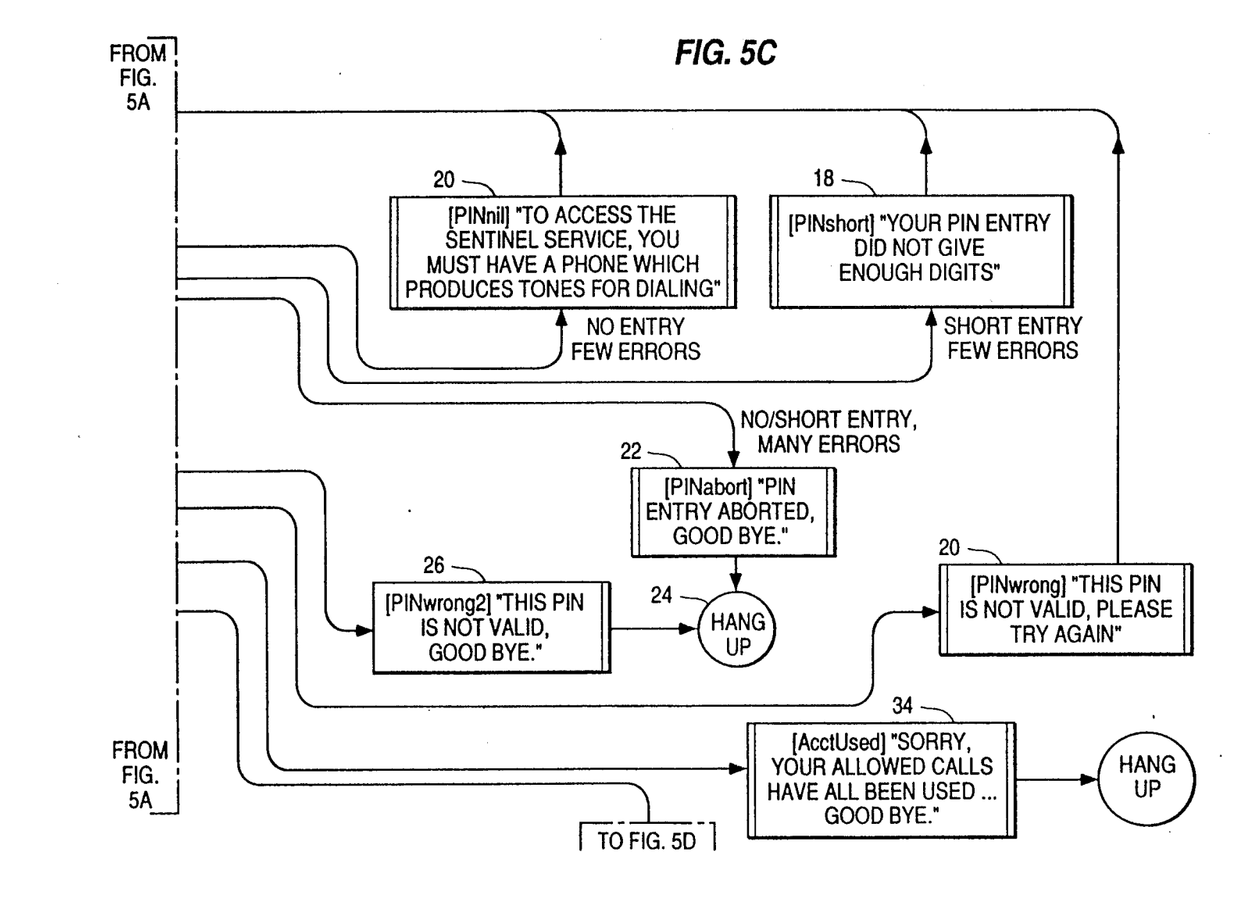
Figure 5D:
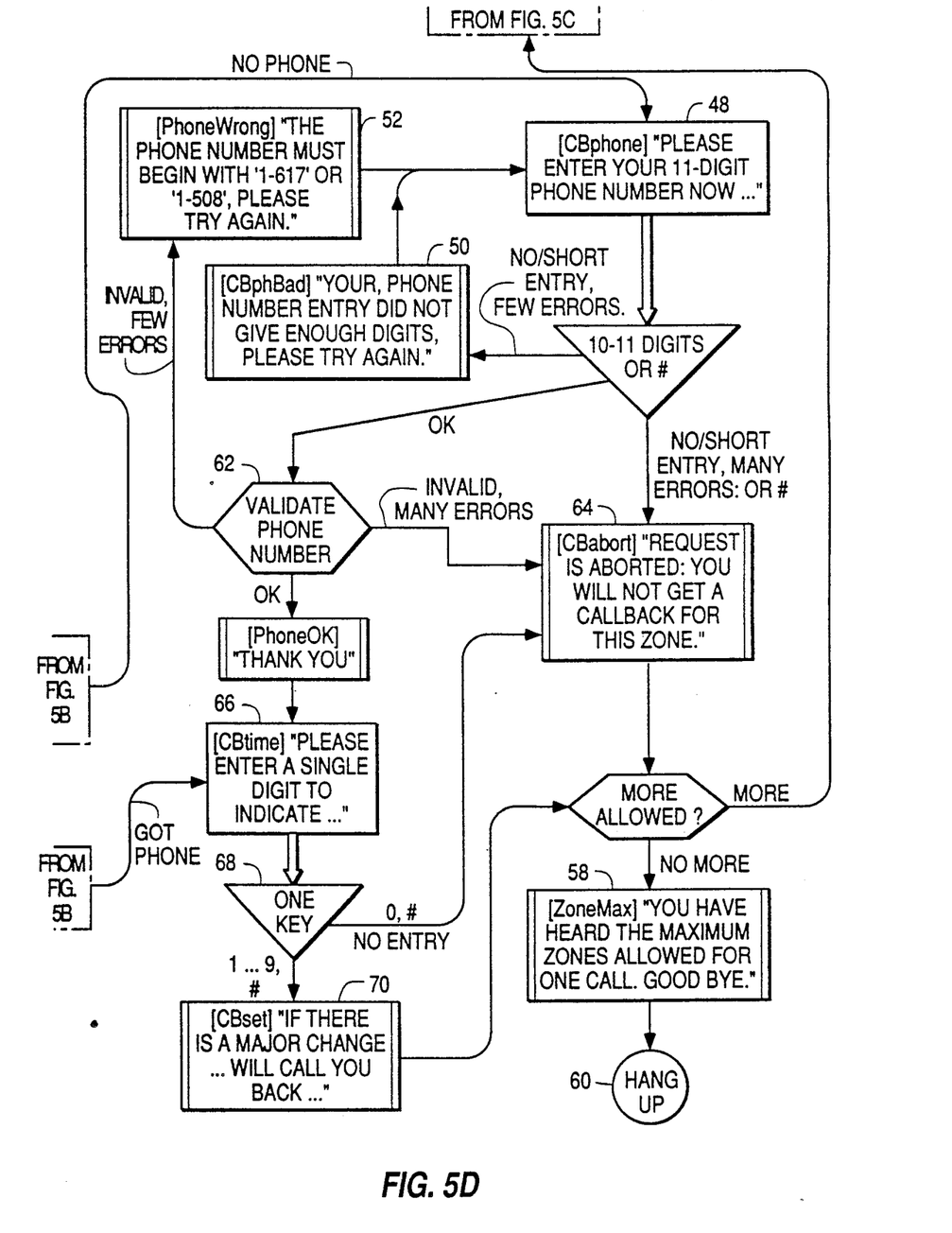

It is now in order to detail the manner in which the system operates in connection with a preferred software protocol as outlined in the flow charts of FIGS. 5A and 5B. Noting, first, the keying legends at the bottom of FIG. 5B, the diagram of FIGS. 5A and 5B was prepared to minimize its visual complexity by using double-line arrows to indicate multiple loops, called "key press passed on", so that not every box will be played in sequence. Instead, one looks through a series of boxes to find the next triangle ("keypress input") where such key press input is actually used by the computer. The double-lined boxes in the diagram indicate messages that cannot be overriden by touch tone key press, so that the whole message is heard. In the single-line boxes, on the other hand, one can override or interrupt by making a key press on the touch tone key pad, with the before-mentioned triangle indicating the point at which a key press is interpreted. The hexagon configuration in the diagram is an action by the system audiotext computer AT; and the circles indicate customer initiated hangups.

Starting with the upper left of FIG. 5A, a series of flow lines indicate a caller's entry into the system. There are two basic kinds of calls that can be handled by the system. One category is the occasional user; the other, is the subscriber. Occasional users may call in on one particular type of phone number, such as the Nynex "976" line—a pay-per-call line that is billed back through the customer's phone bill. The other category of service availability is a subscriber base where the subscriber will call in on a free line, say a local 800 number, and having been given at the time of subscription a 9-digit personal code identification or PIN number, will have a large number of calls available at a discounted rate compared to the occasional caller. The subscriber, however, will not have an unlimited number of calls in order to avoid misuse by sharing the PIN number with others.

Basically, when someone calls in to the service and is answered at 2, FIG. 5A, the caller will initially get an introductory or welcome message at 4, and at that point the computer will determine at 6 which kind of phone line has called in—the pay-per-call line or the subscriber's free line. If it is a pay-per-call call, a further message is provided at 8, explaining the cost of the call and service, and then the caller will be passed on into the main part of the program. If however, the computer determines the caller to be a subscriber, instead of getting the warning message 8 about the cost per call, the subscriber will be asked at 10 to enter his or her 9-digit PIN identification code number at that point. The diagram shows a number of routes that may follow depending upon whether the entered PIN number is complete and accurate or whether there are mistakes.

If the subscriber has entered the correct 9 full digits sequentially on a touch-tone phone at 12, the system will say "thank you" at 14, and it will proceed to validate the number at 16. If it is valid, the subscriber will then be passed into the system. If, however, the number is invalid as if it is not entered by a touch phone (as at 20), or it does not have 9 digits or the nine digits were not received, or if the caller punched a key for too short a period of time, as at 18, the system will so inform the caller. The caller may have up to three tries to enter the correct subscriber PIN number before the call is aborted at 22 with a hang-up 24. Similarly, if the number has the correct format but is invalid, the caller will again be told that the number is invalid at 20 and asked to try again. Again, three tries are allowed before the call is stated to be invalid at 26 and is aborted at 22 with a hang up 24. If the format of the number is correct and account number is valid, the computer will then check the account's status at 28 to check whether or not the subscriber has used the allocated number of calls for the month. If not, the caller is passed to the system at 30. If the subscriber has only one call left, the caller is warned of such fact at 32. If, in fact, the caller has exhausted the allocated number of calls for the month, the caller will be informed that he or she cannot make a call at this time at 34, but will be given a number to call a live operator to increase the charges to their account.

Once the entry process has been completed, the occasional caller and the subscriber are given a message at 36 requesting entry of a 2-digit code which will correspond to the selected or specified zone or particular category of interest to the caller and concerning which the caller wants information—such as a geographical zone in which traffic information is desired. If the caller enters a 2-digit code immediately, the caller can override the instructions at 38 as to available zone information as when the caller knows the zone of interest or the category of information that the caller desires. Once entering the 2-digit number, the caller will hear the message from 40-40' corresponding to information on the particular zone or category of interest, such as traffic information.

At the end of the zone report or message, the callers will be asked at 42 whether they would like to be called back if information changes on that particular zone or category. If they will respond in the affirmative, as by pressing the star key at 44, the system will check at 46 whether or not it already has the caller's identifying phone number stored. If the caller is a subscriber, of course, the system has the phone number stored, and it will then so note in the software that the caller wants a call back. If the caller has already made a callback request for another zone, but is an occasional caller, the computer will also have the phone number, so, simply entering the star key will be sufficient.

If, however, the caller is an occasional user and this is the first of three possible zones that the caller wants a callback on, the system will ask them at that point at 48 to enter an 11-digit identifying phone number. It will again take them through a couple of loops if they have trouble entering the number, either in terms of not enough digits, as at 50, entering an incorrect area code at 52, or entering a number that the computer didn't understand as when the transmission did not come through clearly, with validation at 62 and abort at 64, when appropriate.

Once the phone number has been entered successfully, however, the system will then ask the caller at 54 and then at 56, whether he or she would like to hear a message from another zone or category. The caller may also ask for repetition of the same zone information by repeating the 2-digit code at 44. If the caller does not wish information from another specific zone or category, the caller just hangs up. Callers are allowed to hear messages and request callbacks for updates (42) for three different zones per single call. After listening to information on such three zones and/or requested callbacks for three zones, the caller is politely told at 58 that the caller has heard the maximum information allowed for a single call, and there is hang up at 60. Requesting that the caller try again at 72' on false zone requests may be provided, as may notification of false zones at 72, with hang up at 72"; and zone abort and hang up may be achieved at 74 and 74', respectively. If there is absence of zone information, this may also be communicated at 76. The updating call back requested by the caller may be controlled within a preset window of time following the initial information message transmission—say one-half hour for each selected zone, which may be varied at the Central Station. If desired, facility may be provided as at 66 to allow the caller to customize or custom-set the length of time in which the caller wants an update for each individual zone. It would allow the caller to set a short window of time, for example, for call-back for a zone in which the caller is presently located; and a slightly longer time window for call-back for zones into which the driver will travel; the time windows being the way the system serves both occasional and subscription callers.

In recapitulation, thus, in accordance with the method and protocol of the invention, in preferred form, traffic information is requested and supplied in a telephone channel communication between a Central Station (CP, FIGS. 1 and 2) and a plurality of callers (T, CT) distributed in different zones throughout a geographical area and all telephonically linked with said station. The central station collects and updates traffic information useful for said callers on a real-time and continual basis from a plurality of sources (DG, Field Stations, etc.) for all the zones throughout said area. The system responds to the telephone dialing of the station on the caller's telephone keyboard and the entering on said keyboard of a code for the particular zone of interest specified by the caller (at 44, FIGS. 5A and 5B), by telephonically transmitting back from the station to such caller a report (at 40, FIG. 5B and at 25, FIG. 1 and at T and CT, FIG. 2) of the traffic information requested by the caller and in the particular zone specified by the caller. The system further responds to the caller's subsequent keyboard entry (42–44) requesting updating of significant changes in the traffic information within said specific particular zone within a limited predetermined time period following said report, by storing the caller's telephone number (16, 46, 62) and causing the station to call said caller's telephone number to deliver such update of significant changes should they occur in that zone within that limited time period following said report. The caller is afforded the opportunity by further request entries on the keyboard (at 44) to request a repeat of the transmitted report in the same zone and/or to request traffic reports for additional keyboard-selected zones (54, 56, 44) all on the same call; and further to request by keyboard entry updating reports in each of the selected zones in the event of significant changes in traffic information within predetermined time periods following the initial report(s). That time period may be predetermined or may be varied at keyboard entry request (66, 68) of the caller or by the Central Station. Subscribers whose telephone numbers are permanently stored at the station enter a code on the keyboard when requesting said updating, and the occasional callers in entering such request enter their respective telephone numbers.

The operation as traced in FIGS. 5A and 5B has been largely from the perspective of the caller and the caller's interaction with the system. Returning to the Central Station operation, the traffic information, as before explained, is collected by a number of external means 1,3,5,7,9,13,11, 17,19 (DG), FIG. 1, and "Field Stations", etc., FIG. 2, with the raw data brought into the physical location where the "Audiotex" computer AT in FIG. 2, resides. That information is reviewed and validated by humans at the Central Station CP, and once a piece of information that is critical for the customers of the system to know about has been determined, the content of the information is written out either on paper or on the computer terminal ID of FIG. 2, and it is then passed either physically or electronically to the Announcer (FIG. 2) who will sit at a control console for the "Audiotex" system computer AT, and key in a series of commands which will create a message index number so that the messages can be sorted at a later time. Once the initial controlling commands are entered, they will actually record and store the messages that the customer callers will hear when they call. They record using preferably a microphone which is hard-wired into the "Audiotex" computer AT so that the information and messages that the callers listen to are in actual human voice.

In implementation, the novel methodology of the invention adds considerable adjunct capability to the conventional callback capability of known systems adapted for handling call-ins, whether it be the pay-per-caller going through the check or the subscriber with the PIN number and having conventional dial-out capability with bidirectional ports. In accordance with the present invention, capability has been added internally of the computer to provide a database on a separate computer of phone numbers that can be looked up for call-back. The call-back control software, the protocol of which is traced in FIGS. 5A and 5B, has been provided as an interface module so that it can receive the phone numbers, store them in a register, one by one, and as soon as somebody has completed entering the 11 digits and it is a valid phone number 48 (FIG. 5A), the new system will immediately pass it over into the database in a separate computer. Then, when a call-back is triggered (and that will happen by the operations manager at the Central Station, FIG. 2, determining that conditions have changed enough in this zone that callers should be updated), the announcer at the "Audiotex" AT system will key in a command which triggers the call-back. That will then cause the separate call-back computer software in the separate computer to dump back the phone numbers, one by one, into the "Audiotex" system for outdialing to those callers who have requested automatic zone update of significant changes within the predetermined time window after the initial report.

While in the main system of FIGS. 1 and 2, the collected information to be imparted to the caller is digitally stored at the Central Station CP and transmitted on request (or for update) by the voice messaging "Audiotex" station AT at 25 over the land-line telephones T or cellular phones CT, where the previously described proprietary audio receives A and/or video receivers V are to be used by the customer (the latter as for presentations such as in FIG. 4), the techniques of the invention may be employed by providing such storage of information (periodically updated from Central Station AT by radio transmission equipment 31, FIG. 1) locally at the customer's proprietary receivers, with the customer interacting with the customer's own locally stored information rather than directly with that remotely stored at the Central Station. Basically, the only difference in operation is thus that, in the telephone line mode, the information is stored at the control Central Station and is transmitted when the customer requests the same over the telephone (land-line or radio) link; whereas, with the proprietary audio and/or video customer receiver mode, the information is locally stored at such receivers by radio transmission from the Central Station before the customer requests it, and is locally communicated to the customer user for presentation on the proprietary equipment, when requested. The digital information, broken down as to graphics, RAM for common traffic data, RAM for map data, etc. is encoded and transmitted periodically for storage and retrieval with speech and video synthesis or reconstruction at the proprietary receivers. The single set of updated data transmitted for local storage, moreover, is used both for the audio and graphic interpretations of the information.

The respective proprietary audio and video receivers A and V, thus will function interactively with the user in a manner similar to the previously described customer interaction with the telephone, to access traffic or ancillary information. A keyboard selection $K_A$ and $K_V$, FIG. 6, will still cause previously recorded information to be played back (either audibly or visually). The principal difference, as above stated, is that the recorded information will be downloaded to each receiver immediately after recording and stored locally, instead of being stored centrally at the Central Station CP and downloaded upon request, as with the telephone-link access.

Figure 6:
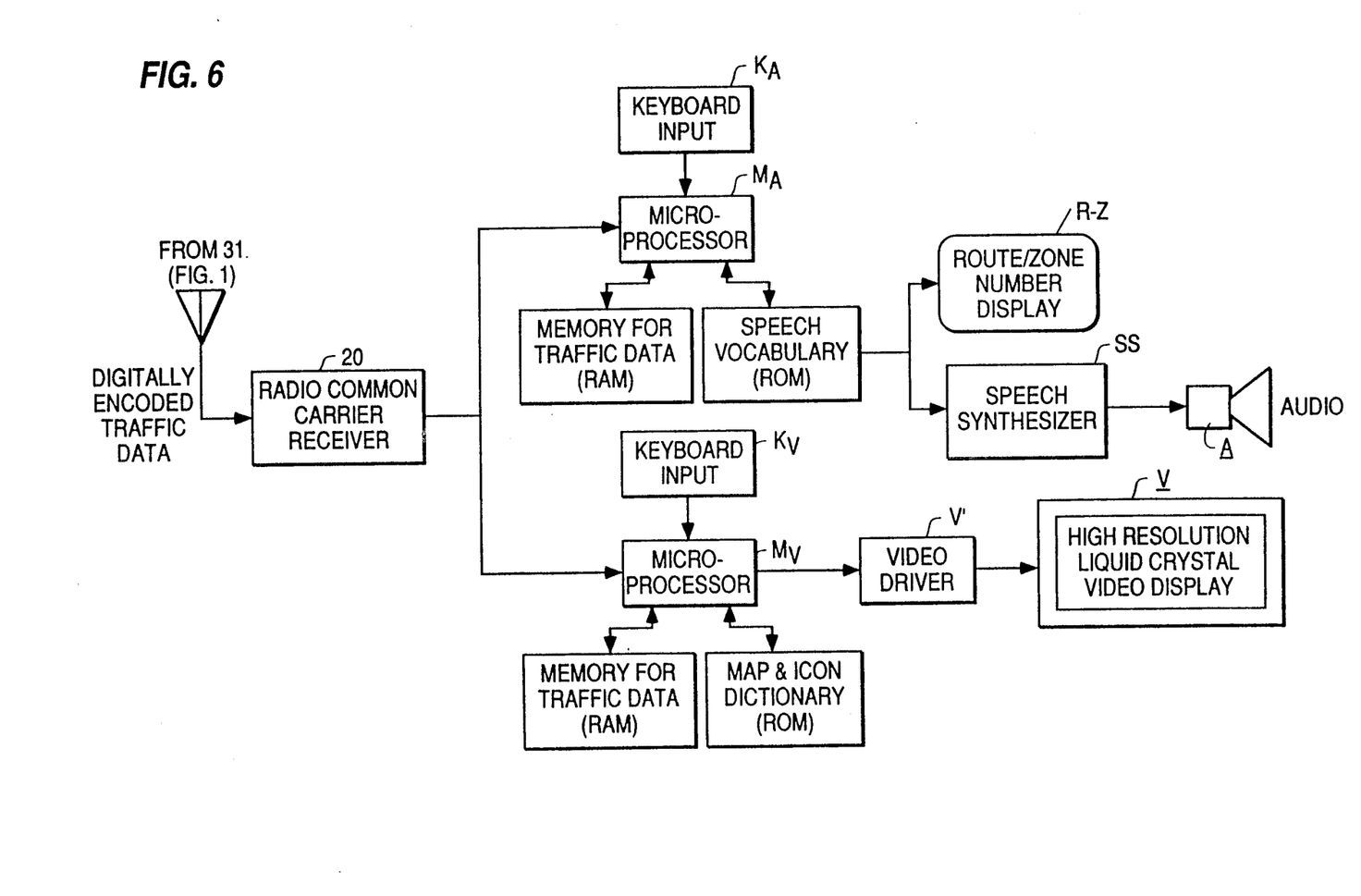
FIG. 6 is a block diagram of the specialized audio and video receivers also useful with the technique underlying the invention.

Referring further to FIG. 6, accordingly, the periodic sets of digitally encoded traffic data from transmitter 31 of FIG. 1 are shown received at a decoding radio receiver 20 and fed to the audio receiver section microprocessor $M_A$ and the video microprocessor $M_V$, each interchanging with local storage systems; a memory RAM for the common traffic data, and a speech vocabulary ROM for the audio receiver (so-labelled), and a map and icon dictionary memory ROM for the separate video display of the information at V.

Another unique feature of the proprietary audio and video receivers, also above recounted, resides in the fact that they utilize the same information channel 20 containing digitally encoded information to construct separately audio or video formats of the information. Thus, only one source of information is needed to reconstruct the desired data in either audio or video formats; the speech synthesizer SS of well-known type reconstructing a "voice" message at the audio loudspeaker, with route/zone number display preferably also indicated at R-Z, and, where used, the video driver V' completing the video reconstruction for display of the information graphically at V in well-known fashion.

Figure 4:
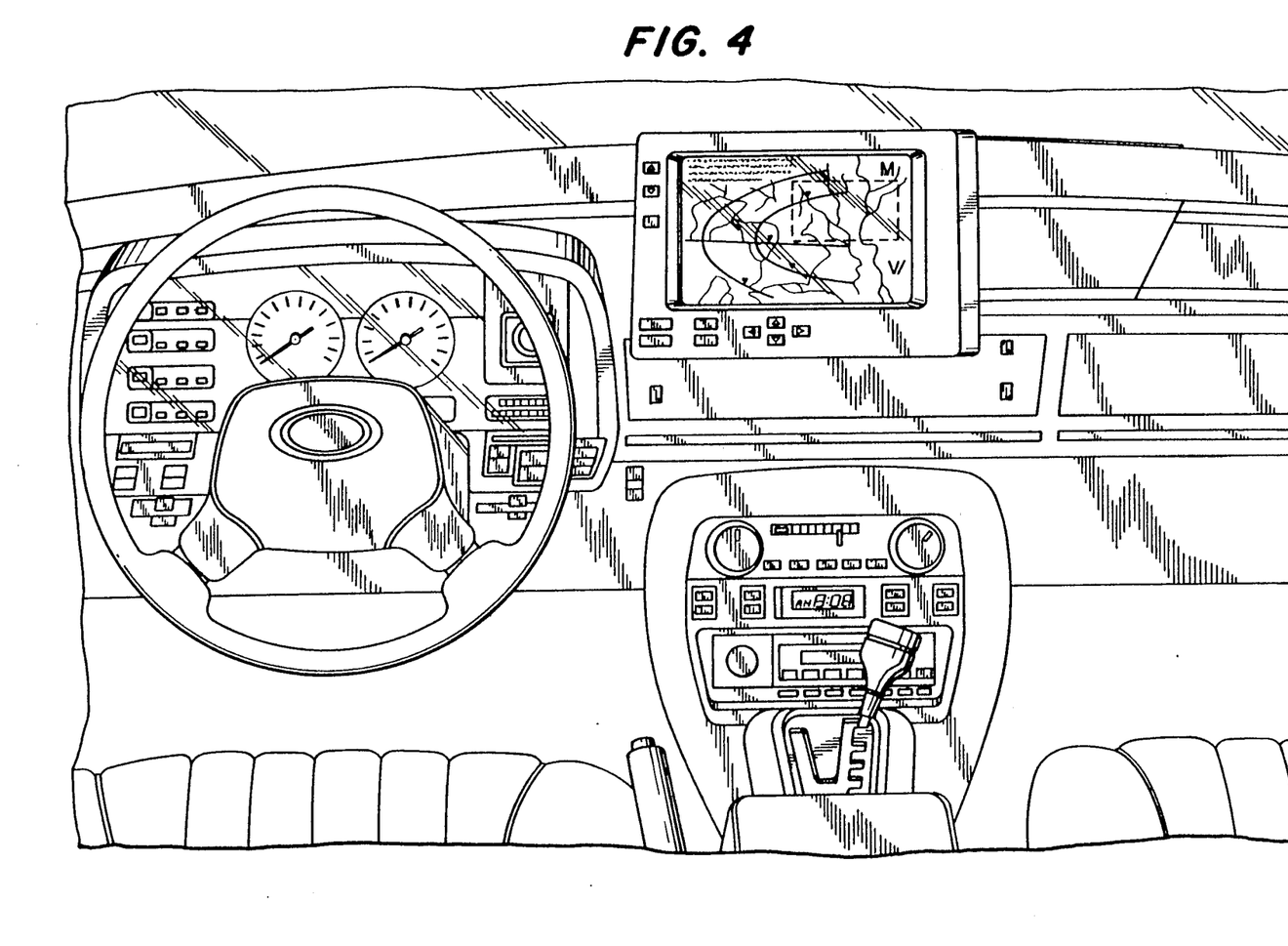
FIG. 4 is a view of a proprietary video receiver in a vehicle adapted to display the map of FIG. 3B.

While the invention has been illustratively described preferably in connection with the important telephone communication linking for traffic information, it has before been explained that the methodology and protocol of the invention may readily be applied to other types of communication links, including specifically, though not restricted to, those using special radio or other energy transmitters cooperating with proprietary customer audio, computer and video receivers, such as the radio link 31 and receivers A and V of FIGS. 1, 4 and 6. It has also been earlier stated that the invention is useful also for other categories of updated information than traffic conditions, including, for example, stock market and business information of various categories, sports, news, weather and other types of information and data as well.

Further modifications will also occur to those skilled in this art and such are considered to fall within the spirit and scope of the invention as defined in the appended claims.

What is claimed is:

1. In a method of information telephone channel communication between a central station and a plurality of callers, in which the steps are performed of collecting, updating and storing information useful for said callers on a real-time and continual basis for different categories of information; responding to the telephone dialing of the station on the caller's telephone keyboard and the entering on said keyboard of a code for the category of interest specified by the caller, by telephonically transmitting back from the station storage to such caller a report of the information requested by the caller and in the particular category specified by the caller; the improvement comprising the caller's controlling by further keyboard entry of both a request for automatic updating of significant changes in the information within said specific particular category and other caller-specified categories and of the setting of variable caller-selected time periods following said report; responding to such caller requests by storing the caller's telephone number and causing the station to call back said caller's telephone number to deliver such update of significant changes should they occur in that category(ies) within that caller requested time period following said report.

2. A method as claimed in claim 1 and in which, following said report, the caller may enter codes on said keyboard for one or more of a request for repetition of the report, and requests for reports for other specified categories of information, all within the one telephone call to the station, and the said station responds by transmitting the requested reports.

3. A method as claimed in claim 2 and in which the caller, upon such requesting of reports on other specified categories of information, may also enter a coded keyboard request for automatic updating of each of said reports in each of said categories in the event of significant changes in such information within predetermined time period(s) following the initial reports, and the station calls back the caller and transmits such updated reports in each of the selected categories in the event of such changes within such time period(s).

4. A traffic information telephone channel communication system interconnecting a central station and a plurality of telephone callers, including mobile or vehicular telephone callers, distributed in different zones throughout a geographical area and all telephonically linked by land lines or radio links with said station, said system having, in combination, a central station provided with means for collecting and updating traffic information useful for said callers from a plurality of sources and on a real-time and continual basis for all the zones throughout said area, and means for organizing and preparing the same for computer-controlled audiotext traffic report transmission to callers through voice messaging equipment; said computer being provided with means for handling call-ins and validating pay-per-caller and subscriber caller calls, and a separate database for storing and retrieving caller phone-numbers for later call back look-up and triggering; means responsive to the validated call for thereupon responding to the entering by the caller on the caller's telephone keyboard of a code for a particular zone of interest so specified by the caller, by transmitting-back to the caller from the station a report of the traffic information requested by the caller and in the particular caller-specified zone; means responsive to the caller's further keyboard entry requesting both automatic updating of significant changes in the traffic information within said caller-specified zone and caller-specified and controlled variable time period following said report, by storing the caller's telephone number in said database for such purpose; and means responsive to the determination at the central station of such significant changes in that zone within that caller-specified time period for triggering the look-up of said database and call back by the station to the caller of an updated traffic report in said specified zone.

5. A traffic information telephone channel communication system as claimed in claim 4 and in which means is provided at the central station computer, operative upon the caller entering on the caller's keyboard a request for repetition of the traffic report, for re-transmitting said report to the caller.

6. A traffic information telephone channel communication system as claimed in claim 4 and in which means is provided for storing in said database the telephone numbers of said subscriber callers and means is provided for the subscriber caller to enter a code on the caller's keyboard to request said automatic updating; and means is further provided responsive to the entering by the said pay-per-call caller in the caller's keyboard of a request for automatic updating, for thereupon entering the pay-per-call caller's telephone number in said database.

7. A traffic information telephone channel communication system as claimed in claim 4 and in which means is provided at said central station computer for pre-fixing the said predetermined time period.

8. A traffic information telephone channel communication system as claimed in claim 4 and in which means is provided at the central station computer, responsive to keyboard entry by the caller, for varying the said predetermined time period.

9. A traffic information telephone channel communication system as claimed in claim 4 and in which means is provided at the central station for digitizing the information of said report and transmitting the same telephonically by the station through telecopier transmission equipment to the caller's facsimile telecopier for reproduction.

10. A traffic information telephone channel communication system as claimed in claim 9 and in which said report comprises a map of said specified zone with traffic incidents displayed superimposed thereupon.

11. A traffic information telephone channel communication system as claimed in claim 4 and in which the central station computer is provided with means for prompting the caller, following said call validation, with the available zones of traffic information and their respective codes for keyboard entry by the caller.

12. A traffic information telephone channel communication system as claimed in claim 11 and in which the central station computer is further provided with means for prompting the caller, following the transmission of a traffic report in said caller-specified zone, to request traffic information on other specified zones, and all on the same call.

13. A traffic information telephone channel communication system as claimed in claim 12 and in which means is provided, responsive to the caller entering one or more further zone codes on the caller's keyboard, for transmitting traffic information reports from the station for each of the further selected zones on the same call.

14. A traffic information telephone channel communication system as claimed in claim 13 and in which means is provided, responsive to the caller entering on the caller's keyboard requests for automatic updating reports from the station in each of the further selected zones in the event of significant changes in traffic information within predetermined time period(s) following the initial reports, for triggering caller phone look-up in said database and call back from the station to the caller with such updating reports, upon determination at the central station of the occurrence of such significant changes in the respective selected zones within such time period(s).

15. In a method of traffic information telephone channel communication between a central station and a plurality of callers distributed in different zones throughout a geographical area and all telephonically linked with said station, in which the steps are performed of collecting and updating traffic information useful for said callers from a plurality of sources and on a real-time and continual basis for all the zones throughout said area; responding to the telephone dialing of the station on the caller's telephone keyboard and the entering on said keyboard of a code for the particular zone of interest so specified by the caller, by telephonically transmitting back from the station to such caller a report of the traffic information requested by the caller and in the particular zone specified by the caller; the improvement comprising the caller's controlling by further keyboard entry of both a request for automatic updating of significant changes in the traffic information within said specific particular zone and other caller-specified zones, and of the setting of variable caller-selected time periods following said report; responding to such caller requests by storing the caller's telephone number and causing the station to call back said caller's telephone number and causing the station to call back said caller's telephone number to deliver such update of significant changes should they occur in the zone(s) within that caller's requested time period following said report.

16. A method as claimed in claim 15 and in which, following said report, the caller enters on said keyboard a request for repetition of the report, if desired, and said station responds with such repetition.

17. A method as claimed in claim 15 and in which said callers comprise subscribers whose telephone numbers are permanently stored at the station and occasional callers, and wherein the subscriber enters a code on the keyboard when requesting said updating, and the occasional callers, in entering such request, enter their respective telephone numbers.

18. A method as claimed in claim 15 and in which the station prompts the caller as to the code numbers for available zones of information.

19. A method as claimed in claim 15 and in which said report is digitized and telephonically transmitted by the station to the caller's facsimile telecopier for reproduction.

20. A method as claimed in claim 19 and in which said report comprises a map of said specified zone with the traffic incidents displayed superimposed thereupon.

21. A method as claimed in claim 15 and in which the caller, by further request entries on the caller's keyboard, may request traffic reports for additional keyboard-selected zones, all on the same call to the central station, and the station transmits such traffic information for each of the selected zones.

22. A method as claimed in claim 21 and in which the caller, by additional entries on the caller's keyboard, may request automatic updating reports in each of the selected zones in the event of significant changes in traffic information within predetermined time period(s) following the initial report(s), and the station calls back the caller and transmits such updated reports in each of the selected zones in the event of such changes within such time period(s).

23. A method as claimed in claim 21 and in which the station prompts the caller following the transmission of a report on traffic in said particular specified zone to consider entering codes for requesting information on other specified zones, and all on the same call.

* * * * *